United States Patent
Ding et al.

(10) Patent No.: US 11,496,379 B1
(45) Date of Patent: Nov. 8, 2022

(54) NETWORK TRAFFIC ANALYSIS METHOD AND DEVICE BASED ON MULTI-SOURCE NETWORK TRAFFIC DATA

(71) Applicant: National University of Defense Technology, Changsha (CN)

(72) Inventors: Zhaoyun Ding, Changsha (CN); Hang Zhang, Changsha (CN); Fei Wang, Changsha (CN); Weike Liu, Changsha (CN); Xianqiang Zhu, Changsha (CN); Bin Liu, Changsha (CN); Cheng Zhu, Changsha (CN); Yi Liu, Changsha (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/835,693

(22) Filed: Jun. 8, 2022

(30) Foreign Application Priority Data

Jan. 21, 2022 (CN) .......................... 202210073213.1

(51) Int. Cl.
*H04L 43/062* (2022.01)
*H04L 43/106* (2022.01)
*H04L 43/0888* (2022.01)
*H04L 43/0811* (2022.01)

(52) U.S. Cl.
CPC ........ *H04L 43/062* (2013.01); *H04L 43/0811* (2013.01); *H04L 43/0888* (2013.01); *H04L 43/106* (2013.01)

(58) Field of Classification Search
CPC ............... H04L 43/062; H04L 43/0811; H04L 43/0888; H04L 43/106
See application file for complete search history.

(56) References Cited

U.S. PATENT DOCUMENTS

| | | | | |
|---|---|---|---|---|
| 11,381,640 | B2 * | 7/2022 | Savalle | H04L 67/1044 |
| 2012/0284791 | A1 * | 11/2012 | Miller | H04L 63/0227 726/22 |
| 2017/0161633 | A1 * | 6/2017 | Clinchant | G06N 5/02 |
| 2021/0344745 | A1 * | 11/2021 | Mermoud | H04L 41/147 |
| 2022/0188410 | A1 * | 6/2022 | Allahdadian | G06K 9/6228 |

OTHER PUBLICATIONS

Sethi et al., "On the reliable detection of concept drift from streaming unlabeled data", Elsevier Ltd, 2017 (Year: 2017).*

* cited by examiner

*Primary Examiner* — Jerry B Dennison
(74) *Attorney, Agent, or Firm* — Westbridge IP LLC

(57) ABSTRACT

Disclosed are a network traffic analysis method and a device based on multi-source network traffic data. The method includes: deploying a pre-training classifier pool in a network stream data source; receiving multi-source network stream data at a current moment for each data source, classifying the multi-source network stream data through an online classifier, performing feature processing and transformation on data collected by each network stream data source at each preset time interval, and transmitting processed traffic data features and a feature transformation matrix to a traffic drift detection module. The traffic drift detection module contains historical concept data to detect a concept drift according to the traffic data features, the feature transformation matrix and the historical concept data; if the concept drift is detected, the online classifier deployed by multiple sources is reset. This method is used for continuous real-time and accurate analysis of the multi-source network traffic data.

10 Claims, 3 Drawing Sheets

NETWORK TRAFFIC ANALYSIS METHOD AND DEVICE BASED ON MULTI-SOURCE NETWORK TRAFFIC DATA

CROSS-REFERENCE TO RELATED APPLICATIONS

This application claims priority to Chinese Patent Application No. 202210073213.1, filed on Jan. 21, 2022, the contents of which are hereby incorporated by reference.

TECHNICAL FIELD

The application relates to the technical field of network traffic analysis, and in particular to a network traffic analysis method and a device based on multi-source network traffic data.

BACKGROUND

In order to analyze and mine a cyberspace traffic, fully understand a business flow and information transmission in a cyberspace, a target traffic in the cyberspace is identified based on basic means of data transmission in the cyberspace. Actual network traffic data is often collected by network probes deployed on different types of terminal devices. Each network probe serves as a source of collected information, and the collected network traffic data is stored and utilized in a form of a network data stream. Faced with a fast-changing complex situation of the network, conventional methods of data collecting, collecting and processing, labeling training and model publishing need a lot of time for data and model transmission and deployment, so the methods have a strong lag and make it difficult to analyze and process the network traffic in real time. In addition, due to dynamic changes of a network environment and network behaviors, a concept drift phenomenon of data features and a data label mapping function changes, thus affecting an accuracy of a traffic analysis. A network traffic analysis method needs to dynamically detect and deal with the concept drift, so as to improve a traffic analysis ability.

SUMMARY

It is necessary to provide a network traffic analysis method and a device based on multi-source network traffic data that meet real-time requirements for a multi-source network traffic data analysis.

A network traffic analysis method based on multi-source network traffic data includes:

deploying a classifier pool in a network stream data source, of which the classifier pool includes a plurality of trained online classifiers, and each network stream data source deploys one trained online classifier;

using current network traffic data collected by a network traffic collector as a network traffic data sample at each moment for each network stream data source, and using the online classifier deployed in the corresponding network stream data source to classify the network traffic data sample; and a concept drift detection: performing feature processing and transformation on the network traffic data collected by each network stream data source at each preset time interval, and transmitting processed traffic data features and a feature transformation matrix to a traffic drift detection module; the traffic drift detection module contains historical concept data to detect a concept drift according to the traffic data features, the feature transformation matrix and the historical concept data; if the concept drift is detected, updating the online classifier deployed in the corresponding network stream data source.

In one embodiment, the method further includes the classifier pool which contains a plurality of online classifiers which are updated incrementally, deploys the online classifiers in the classifier pool in each network stream data source respectively, and receives the network stream data source by the network traffic collector to classify the network stream data source.

In one embodiment, the method further includes:

centralizing each sample feature in a sample feature matrix to obtain processed sample features $$x_i \leftarrow x_i - \frac{1}{n}\sum_{i=1}^{n} x_i,$$

where $x_i$ represents the $i^{th}$ feature of the sample feature matrix;

updating the data feature matrix by using the processed sample features to obtain an updated data feature matrix S;

calculating a covariance matrix $$\frac{1}{n}S^T S$$

of the updated data feature matrix;

calculating eigenvalues and eigenvectors corresponding to the covariance matrix, and sorting the eigenvalues and the eigenvectors in a descending order of the eigenvalues; selecting the eigenvectors corresponding to the top d eigenvalues to form a feature transformation matrix $U = [w_1, \ldots, w_d]$; and according to the data sample and the feature transformation matrix, solving $Z = S \times U$ to obtain a dimension-reduced data feature matrix.

In one embodiment, the method further includes:

transforming the data feature matrix of historical concept data by using the feature transformation matrix to obtain a feature matrix of the historical concept data after feature transformation;

averaging the dimension-reduced data feature matrix and the transformed historical data feature matrix to obtain a data mean;

according to a Kullback-Leibler divergence (KL divergence) of the dimension-reduced data feature matrix and the data mean, a KL divergence of the transformed historical data feature matrix and the data mean, obtaining a Jensen-Shannon divergence (JS divergence) between the data feature matrix and the historical data feature matrix; and when the JS divergence is greater than a preset significance parameter, determining that the network traffic data of the corresponding data source drifts.

In one embodiment, calculating a KL divergence of the data feature matrix and the data mean includes:

$$KL(z_k \| \mu_k) = \sum_d \mu_k(x) \log \frac{\mu_k(x)}{z_k(x)},$$

where $\mu_k$ represents the data mean, $z_k(x)$ represents the dimension-reduced data feature matrix, $KL(z_k \| \mu_k)$ represents the KL divergence of the dimension-reduced data feature matrix and the data mean, and a number of data features is d.

In one embodiment, calculating a KL divergence of the historical data feature matrix and the data mean includes:

$$KL(p_k \| \mu_k) = \sum_d \mu_k(x) \log \frac{\mu_k(x)}{p_k(x)},$$

where $\mu_k$ represents the data mean, $p_k(x)$ represents the historical concept data feature matrix after feature transformation, $KL(p_k \| \mu_k)$ represents the KL divergence of the historical data feature matrix and the data mean, and the number of data features is d.

In one embodiment, the method further includes:

obtaining the JS divergence between the data feature matrix and the historical data feature matrix according to the KL divergence of the dimension-reduced data feature matrix and the data mean and the KL divergence of the transformed historical data feature matrix and the data mean as follows:

$$JSD(p_k \| z_k) = \frac{1}{2} KL(p_k \| \mu_k) + \frac{1}{2} KL(z_k \| \mu_k),$$

where $JSD(p_k \| z_k)$ represents the JS divergence between the data feature matrix and the historical data feature matrix.

A network traffic analysis device based on multi-source network traffic data includes:

a classifier setting module configured to deploy a classifier pool in a network stream data source, where the classifier pool includes a plurality of trained online classifiers, and each network stream data source deploys one trained online classifier;

a traffic classification module configured to use current network traffic data collected by a network traffic collector as a network traffic data sample at each moment for each network stream data source, and classify the network traffic data sample by using the online classifier deployed in the corresponding network stream data source; and a concept drift detection module configured to perform feature processing and transformation on the network traffic data collected by each network stream data source at each preset time interval, and transmit processed traffic data features and a feature transformation matrix to a traffic drift detection module; the traffic drift detection module contains historical concept data to detect a concept drift according to the traffic data features, the feature transformation matrix and the historical concept data; and if the concept drift is detected, the online classifier deployed in the corresponding network stream data source is updated.

In the network traffic analysis method and the device based on the multi-source network traffic data, firstly, the network traffic data is deployed in each network data source; then when an online traffic analysis is conducted, the historical concept data is stored based on a concept of traffic data, and the concept drift of the traffic data is detected through online traffic data and the historical concept data acquired in real time; when the drift is detected, the online classifier is reset in time, so that the online traffic data is analyzed continuously and accurately.

DETAILED DESCRIPTION OF THE EMBODIMENTS

In order to make the objective, technical scheme and advantages of this application clearer, the application will be further explained in detail below with reference to drawings and examples. It should be understood that the specific embodiments described here are only used to explain the application, and are not used to limit the application.

Figure 1:
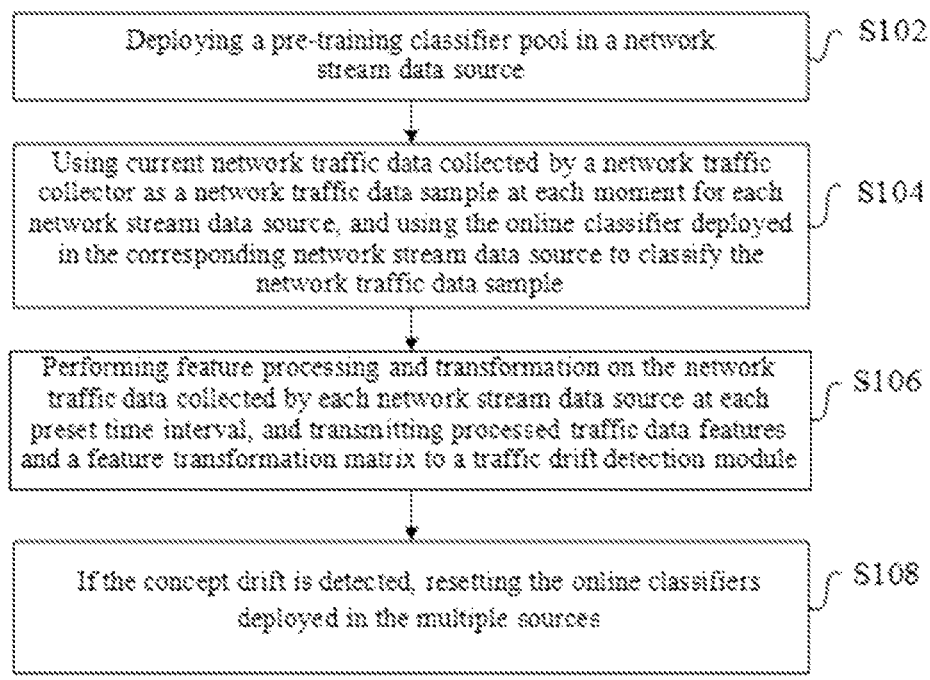
FIG. 1 is a flowchart of a network traffic analysis method based on multi-source network traffic data in an embodiment.

In an embodiment, as shown in FIG. 1, a network traffic analysis method based on multi-source network traffic data is provided, which includes the following steps:

S102, deploying a pre-training classifier pool in a network stream data source.

Specifically, the classifier pool includes a plurality of trained online classifiers, and one trained online classifier is deployed in each network stream data source to form a multi-source traffic model set of multi-source traffic data:

$\Pi = \{\Psi_1, \ldots, \Psi_L\}$;

the multi-source network traffic data is expressed as follows:

$MS = \{S_1^T, \ldots, S_L^T\}$, where $S_l^T = \{x_l^1, \ldots, x_l^T\}$; $T \to \infty$;

if the multi-source traffic data contains L traffic collection sources, $x_l^t \in X_l$, $\hat{y}_l^t \in Y_l$, $X_l$ and $Y_l$ are a data feature distribution space of a multi-source data stream and a corresponding category label, where a value of $Y_l$ is $\mathcal{U} \to \{1, \ldots, M\}$.

S104, using current network traffic data collected by a network traffic collector as a network traffic data sample at each moment for each network stream data source, and using the online classifier deployed in the corresponding network stream data source to classify the network traffic data sample.

Specifically, an optional set of data labels is defined as o: $\mathcal{U} \to \{1, \ldots, M\}$; at the same time, samples of the multi-source data stream arrive simultaneously, and $X_t = \{x_1^t, \ldots, x_L^t\}$, where $x_L^t$ is an unlabeled data sample on the $l^{th}$ data source at t time.

A traffic analysis is based on the online classifier deployed online; however, a type of traffic data is not static, and the feature distribution and a category changes to some extent, thus leading to a decrease of an accuracy of an original traffic classification model. Therefore, in the traffic analysis, whether the type of the network traffic data changes should be always concerned about, so as to carry out a concept drift detection.

S106, performing feature processing and transformation on the network traffic data collected by each network stream data source at each preset time interval, and transmitting processed traffic data features and a feature transformation matrix to a traffic drift detection module.

The traffic drift detection module contains historical concept data to detect a concept drift according to the traffic data features, the feature transformation matrix and the historical concept data.

S108, if the concept drift is detected, updating the online classifier deployed in the corresponding network stream data source.

In the network traffic analysis method based on the multi-source network traffic data, firstly, the network traffic collector is deployed at each network data source, and the network traffic data is acquired through the network traffic collector; then, when an online traffic analysis is conducted, the historical concept data is stored based on a concept of the traffic data, and the concept drift of the traffic data is detected through online traffic data and the historical concept data acquired in real time; when the drift is detected, the online classifier is reset in time, so that the online traffic data is analyzed continuously and accurately.

In one embodiment, the classifier pool contains a plurality of online classifiers which are updated incrementally; the online classifiers in the classifier pool are respectively deployed in each network stream data source, and a network stream data sample is received by the network traffic collector to classify the network stream data sample.

In one embodiment, each sample feature in a sample feature matrix is centralized to obtain processed sample features $$x_i \leftarrow x_i - \frac{1}{n}\sum_{i=1}^{n}x_i,$$

where $x_i$, represents the ith feature of the sample feature matrix; the data feature matrix is updated by using the processed sample features to obtain an updated data feature matrix S; a covariance matrix $$\frac{1}{n}S^T S$$

of the updated data feature matrix is calculated; eigenvalues and eigenvectors corresponding to the covariance matrix are calculated, and the eigenvalues and the eigenvectors are sorted in a descending order of the eigenvalues; the eigenvectors corresponding to the top d eigenvalues are selected to form a feature transformation matrix $U=[w_1, \ldots, w_d]$; Z=SxU is solved according to the data sample and the feature transformation matrix, and a dimension-reduced data feature matrix is obtained.

Specifically, the eigenvalues of all samples are centralized as $$x_i \leftarrow x_i - \frac{1}{n}\sum_{i=1}^{n}x_i,$$

and a covariance matrix $$\frac{1}{n}S^T S$$

of a sample set is obtained; eigenvalues and eigenvectors of covariance are solved, and data eigenvectors $\{w_1, \ldots, w_d\}$ corresponding to the maximum d eigenvalues are selected, where d is less than a feature number m, which is generally set to 6 in the application. An eigenvector matrix $U=[w_1, \ldots, w_d]$ is composed of the eigenvectors, where U is an nxd-dimensional matrix, also known as the feature transformation matrix. A new data feature matrix Z=SxU is solved. After the solution, a new sample feature set Z of traffic data is an nxd-dimensional matrix, thus realizing a dimension reduction process from large-scale data to small sample data, and retaining original features of the traffic data as much as possible.

In one embodiment, B data are selected each time as the historical concept data corresponding to each online classifier without repeating a random selection K times from an initialization data set, where K is a number of the online classifiers. A main function of a historical concept data storage module is to store network traffic data samples with historical concepts; these stored samples hold the historical concepts of the corresponding data sources and are defined as $P=\{p_1, \ldots, p_K\}$; and B samples are stored for each data source.

In one embodiment, the data feature matrix and a historical data feature matrix are averaged to obtain a data mean; a Jensen-Shannon divergence (JS divergence) between the data feature matrix and the historical data feature matrix is obtained according to a Kullback-Leibler divergence (KL divergence) of the data feature matrix and the data mean and a KL divergence of the historical data feature matrix and the data mean; and when the JS divergence is greater than a preset significance parameter, it is determined that the online classifier drifts.

In one embodiment, the KL divergence of the data feature matrix and the data mean is calculated as:

$$KL(z_k\|\mu_k) = \sum_d \mu_k(x)\log\frac{\mu_k(x)}{z_k(x)},$$

where $\mu_k$ represents the data mean, $z_k(x)$ represents the data feature matrix, $KL(z_k\|\mu_k)$ represents the KL divergence of the data feature matrix and the data mean, and the feature number of the data feature matrix is d.

In one embodiment, the KL divergence of the historical data feature matrix and the data mean is calculated as:

$$KL(p_k\|\mu_k) = \sum_d \mu_k(x)\log\frac{\mu_k(x)}{p_k(x)},$$

where $\mu_k$ represents the data mean, $p_k(x)$ represents the historical data feature matrix, $KL(p_k\|\mu_k)$ represents the KL divergence of the historical data feature matrix and the data mean, and the feature number of the historical data feature matrix is d.

In one embodiment, according to the KL divergence of the data feature matrix and the data mean, and the KL divergence of the historical data feature matrix and the data mean, the JS divergence between the data feature matrix and the historical data feature matrix is obtained as follows:

$$JSD(p_k\|z_k) = \frac{1}{2}KL(p_k\|\mu_k) + \frac{1}{2}KL(z_k\|\mu_k),$$

where $JSD(p_k\|z_k)$ represents the JS divergence between the data feature matrix and the historical data feature matrix.

Specifically, for each data source k, a dimension-reduced data feature $z_k$ transmitted to a concept drift detection module, the feature transformation matrix $u_k$ and the data $p_k$ in the historical concept data storage module of the matrix, the following steps are sequentially performed.

1) Taking $v = \min[\text{count}(p_k), \text{count}(z_k)]$ as a number of samples in a drift detection set, and randomly selecting samples from many data without repetition.

2) Using the feature change matrix $u_k$ to transform $p_k$.

3) Calculating a mean $$\mu_k = \frac{p_k + z_k}{2}$$

of two groups of samples.

4) Calculating the JS divergence between distributions of the traffic data:

$$JSD(p_k \| z_k) = \frac{1}{2} KL(p_k \| \mu_k) + \frac{1}{2} KL(z_k \| \mu_k),$$

where KL is a Kullback-Leibler divergence between calculated sample sets:

$$KL(p_k \| \mu_k) = \sum_d \mu_k(x) \log \frac{\mu_k(x)}{p_k(x)},$$

$$KL(z_k \| \mu_k) = \sum_d \mu_k(x) \log \frac{\mu_k(x)}{z_k(x)}.$$

Generally, the above are calculation formulas of KL, and specific calculation steps are as follows: the number of samples of $\mu_k$, $p_k$ and $z_k$ is v, the number of features is d, and the sample feature matrix of the data is $v \times d$:

$$\begin{bmatrix} x_1^{(1)} & x_2^{(1)} & \cdots & x_d^{(1)} \\ x_1^{(2)} & x_2^{(2)} & & x_d^{(2)} \\ \vdots & \vdots & \ddots & \vdots \\ x_1^{(v)} & x_2^{(v)} & \cdots & x_d^{(v)} \end{bmatrix};$$

where each row is a sample and each column is a feature; an objective of a KL divergence calculation is to measure a difference between each feature; therefore, in a calculation process, a formula calculation is made for each column (each feature):

$$KL(p_k \| \mu_k) = \sum_d \mu_k(x) \log \frac{\mu_k(x)}{p_k(x)};$$

the result of the KL divergence is a one-dimensional matrix with d elements, which are the values of the KL divergence of each feature dimension.

If a JSD is larger than the preset significance parameter a, which is usually taken as 0.6-0.8, the concept drift is considered to occur.

Combined with the above embodiments, the following is explained with a specific embodiment.

1. In an initialization stage, all K classifiers $\Pi = \Psi_1, \ldots, \Psi_k \Psi_k$ deployed in multiple sources are initialized based on the existing network traffic data, and the corresponding classifiers $\Psi_k$ in K data sources are deployed respectively; and network data collectors are deployed respectively.

2. The historical concept data storage module P = $\{p_1, \ldots, p_K\}$ of the multi-source network traffic data corresponding to K data sources is initialized respectively, from $p_1$ to $P_K$; B samples are randomly selected from the existing network traffic data, and the samples are input into the historical concept data storage module.

3. In a deployment and use stage of the model, when t=0, a drift detection time interval counter t*=T is initialized;

3.1 if t*==0, it indicates that a set drift detection time interval T has been reached and a concept drift in the data stream is detected, and S3.2 is jumped to, otherwise S3.3 is jumped to;

3.2 first the drift detection time interval t*=T is reset, and detection steps of the concept drift are performed, and 3.2.1 is jumped to;

3.2.1 for each data source k (k=1, . . . , K), the following steps are performed respectively:

1) defining network traffic data samples arriving in the collection interval T as $S_k$; and 2) calculating the sample data feature matrix $z_k$ and the feature transformation matrix $u_k$ after dimension reduction by using a feature analysis module;

3.2.2 the dimension-reduced sample data feature matrix and the feature transformation matrix of all the data sources are transmitted to the concept drift detection module of multi-source traffic data;

3.2.3 for each data source k (k=1, . . . , K), the following steps are performed respectively:

1) reading the sample data feature matrix $z_k$ and the feature transformation matrix $u_k$, and performing feature transformation operation on the data $p_k$ in the historical concept data storage module;

2) taking $v = \min[\text{count}(p_k), \text{count}(z_k)]$ as the number of samples in the drift detection set, and randomly selecting samples from many data without repetition;

3) calculating a JSD index between a current sample and a historical concept sample;

4) comparing the JSD with the significance parameter a which is usually taken as 0.6-0.8; if the JSD is greater than the significance parameter a, considering that the data source k has the concept drift, otherwise considering that there is no concept drift; and 5) if all data sources have been traversed, jumping to S3.2.4;

3.2.4 for each data source k (k=1, . . . , K), the following steps are performed respectively:

1) if the concept drift of the data source k occurs, a) initiating a sample acquisition request to the data source, and obtaining the network traffic data sample $S_k$ in the current time period from the data source;

b) updating the corresponding historical concept data storage module $p_k$ with $S_k$;

c) labeling the data of $S_k$ and retraining a new network traffic classification model $\Psi'_k$;

d) transmitting the new traffic classification model $\Psi'_k$ to the data source k, replacing an original model; and e) jumping to S3.3; and 2) if there is no concept drift, jumping to S3.3;

3.3 feature processing and classification are performed on the arrived samples with the classifiers $\Pi = \Psi_1, \ldots, \Psi_k$ deployed in multiple sources, and a classification result is output, and S4 is jumped to; and 4. when t=t+1, t*=t*-1, S3 is jumped to.

It should be understood that although the steps in a flowchart of FIG. 1 are shown in sequence as indicated by arrows, these steps are not necessarily executed in sequence as indicated by arrows. Unless explicitly stated in this text, the execution of these steps is not strictly limited in order, and these steps may be executed in other order. Furthermore, at least a part of the steps in FIG. 1 may include a plurality of sub-steps or stages, which are not necessarily completed at the same time, but may be executed at different times, and the execution order of these sub-steps or stages is not necessarily sequential, but may be executed in turn or alternately with other steps or at least a part of the sub-steps or stages of other steps.

Figure 2:
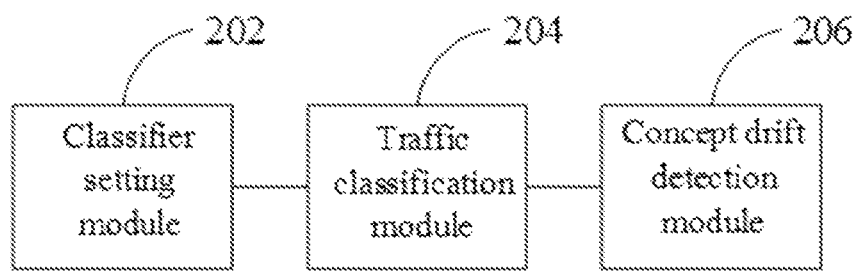
FIG. 2 is a structural block diagram of a network traffic analysis device based on multi-source network traffic data in an embodiment.

In an embodiment, as shown in FIG. 2, a network traffic analysis device based on multi-source network traffic data is provided, which includes a classifier setting module 202, a traffic classification module 204 and a concept drift detection module 206.

The classifier setting module 202 is configured to deploy a classifier pool in a network stream data source, where the classifier pool includes a plurality of trained online classifiers, and each network stream data source deploys one trained online classifier.

The traffic classification module 204 is configured to use the current network traffic data collected by a network traffic collector as a network traffic data sample at each moment for each network stream data source, and classify the network traffic data sample by using an online classifier deployed in the corresponding network stream data source.

The concept drift detection module 206 is configured to perform feature processing and transformation on network traffic data collected by each network stream data source each preset time interval, and transmit processed traffic data features and a feature transformation matrix to the traffic drift detection module; the traffic drift detection module contains historical concept data to detect a concept drift according to the traffic data features, the feature transformation matrix and the historical concept data; and if the concept drift is detected, the online classifier deployed in the corresponding network stream data source is updated.

In one embodiment, the classifier setting module 202 is further used for the classifier pool containing a plurality of online classifiers which are updated incrementally, deploying the online classifiers in the classifier pool to each network stream data source respectively, receiving the network stream data source through the network traffic collector, and classifying the network stream data source.

In one embodiment, the concept drift detection module 206 is further used for:

centralizing each sample feature in the sample feature matrix to obtain the processed sample features $$x_i \leftarrow x_i - \frac{1}{n}\sum_{i=1}^{n}x_i,$$

where $x_i$ represents the $i^{th}$ feature of the sample feature matrix;

updating the data feature matrix by using the processed sample features to obtain the updated data feature matrix S;

calculating the covariance matrix $$\frac{1}{n}S^T S$$

of the updated data feature matrix;

calculating the eigenvalues and the eigenvectors corresponding to the covariance matrix, and sorting the eigenvalues and the eigenvectors in the descending order of the eigenvalues; selecting the eigenvectors corresponding to the top d eigenvalues to form the feature transformation matrix $U=[w_1, \ldots, w_d]$; and according to the data sample and the feature transformation matrix, solving Z=SxU to obtain the dimension-reduced data feature matrix.

In one embodiment, the concept drift detection module 206 is further used for:

transforming the data feature matrix of the historical concept data by using the feature transformation matrix to obtain a feature matrix of the historical concept data after feature transformation;

averaging the dimension-reduced data feature matrix and the transformed historical data feature matrix to obtain the data mean;

according to the KL divergence of the dimension-reduced data feature matrix and the data mean, the KL divergence of the transformed historical data feature matrix and the data mean, obtaining the JS divergence between the data feature matrix and the historical data feature matrix; and when the JS divergence is greater than the preset significance parameter, determining that the network traffic data of the corresponding data source drifts.

In one embodiment, calculating the KL divergence of the data feature matrix and the data mean includes:

$$KL(z_k\|\mu_k) = \sum_{d}\mu_k(x)\log\frac{\mu_k(x)}{z_k(x)},$$

where $\mu_k$ represents the data mean, $z_k(x)$ represents the data feature matrix, $KL(z_k\|\mu_k)$ represents the KL divergence of the data feature matrix and the data mean, and the feature number of the data feature matrix is d.

In one embodiment, calculating the KL divergence of the historical data feature matrix and the data mean includes:

$$KL(p_k\|\mu_k) = \sum_{d}\mu_k(x)\log\frac{\mu_k(x)}{p_k(x)},$$

where $\mu_k$ represents the data mean, $p_k(x)$ represents the historical data feature matrix, $KL(p_k\|\mu_k)$ represents the KL divergence of the historical data feature matrix and the data mean, and the feature number of the historical data feature matrix is d.

In one embodiment, the concept drift detection module 206 is further used for obtaining the JS divergence between the data feature matrix and the historical data feature matrix according to the KL divergence of the data feature matrix and the data mean and the KL divergence of the historical data feature matrix and the data mean as follows:

$$JSD(p_k\|z_k) = \frac{1}{2}KL(p_k\|\mu_k) + \frac{1}{2}KL(z_k\|\mu_k),$$

where $JSD(p_k\|z_k)$ represents the JS divergence between the data feature matrix and the historical data feature matrix.

Refer to a limitation of the network traffic analysis method based on the multi-source network traffic data above for the specific limitation of the network traffic analysis device based on the multi-source network traffic data, so the limitation is not repeated here. Each module in the above-mentioned network traffic analysis device based on the multi-source network traffic data may be realized in whole or in part by software, hardware and their combination. The above modules may be embedded in or independent of a processor in computer equipment in a form of hardware, or may be stored in a memory in the computer equipment in the form of software, so that the processor may call and execute the corresponding operations of the above modules.

Figure 3:
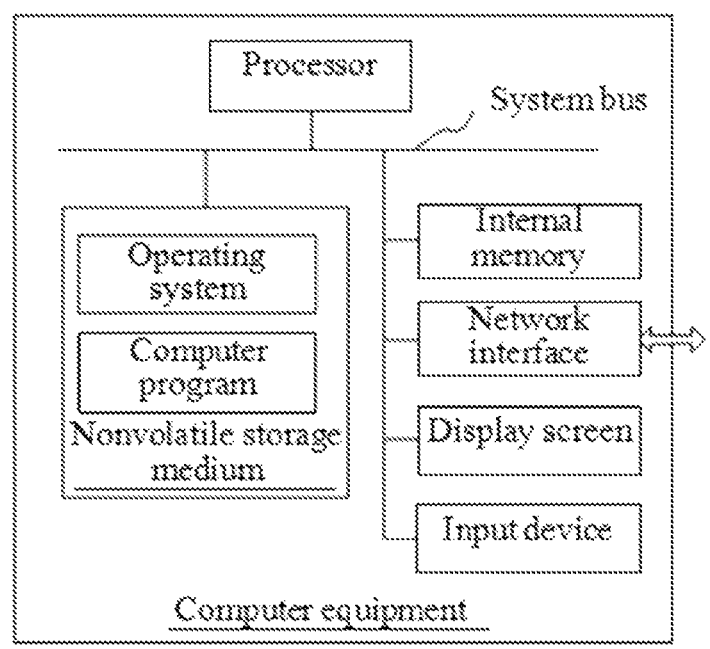
FIG. 3 is an internal structure diagram of a computer equipment in an embodiment.

In one embodiment, a computer equipment is provided, which may be a terminal, and its internal structure diagram may be shown in FIG. 3. The computer equipment includes a processor, a memory, a network interface, a display screen and an input device connected by a system bus. The processor of the computer equipment is used to provide computing and control capabilities. The memory of the computer equipment includes a nonvolatile storage medium and an internal memory. The nonvolatile storage medium stores an operating system and a computer program. The internal memory provides an environment for an operation of the operating system and the computer program in the nonvolatile storage medium. The network interface of the computer equipment is used to communicate with an external terminal through network connection. The computer program is executed by the processor to realize an unlabeled multi-source network traffic data drift detection method. The display screen of the computer equipment may be a liquid crystal display screen or an electronic ink display screen, and the input device of the computer equipment may be a touch layer covered on the display screen, a key, a trackball or a touch pad arranged on the shell of the computer equipment, or an external keyboard, touch pad or mouse.

It may be understood by those skilled in the art that the structure shown in FIG. 3 is only a block diagram of some structures related to the application scheme, and does not constitute a limitation on the computer equipment to which the application scheme is applied; a specific computer equipment may include more or less components than those shown in the figure, or combine some components, or have different component arrangements.

In one embodiment, a computer equipment is provided, including a memory and a processor, the memory stores a computer program, and the processor implements the steps of the method in the above embodiment when executing the computer program.

In one embodiment, a computer-readable storage medium is provided, on which a computer program is stored, and when the computer program is executed by the processor, the steps the method in the above embodiment are implemented.

Those of ordinary skill in the art may understand that all or part of the flow of implementing the method in the above embodiment may be completed by instructing related hardware through a computer program, which may be stored in a nonvolatile computer-readable storage medium; and when executed, the computer program may include a flow of the embodiments of the above methods. Among them, any reference to memory, storage, database or other media used in the embodiments provided in this application may include nonvolatile and/or volatile memory. The nonvolatile memory may include read only memory (ROM), programmable ROM (PROM), electrically programmable ROM (EPROM), electrically erasable programmable ROM (EEPROM) or flash memory. The volatile memory may include a random access memory (RAM) or an external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus), direct RAM (RDRAM), direct memory bus dynamic RAM (DRDRAM), and memory bus dynamic RAM (RDRAM), etc.

The technical features of the above embodiments may be arbitrarily combined. To make the description concise, all possible combinations of the technical features in the above embodiments are not described. However, as long as there is no contradiction between the combinations of these technical features, they should be considered as the scope of this specification.

The above embodiments only express several embodiments of this application, and their descriptions are more specific and detailed, but they should not be understood as limiting the scope of the present application. It should be pointed out that for those of ordinary skill in the art, without departing from the concept of this application, several modifications and improvements may be made, all of which are within the scope of protection of this application. Therefore, the scope of protection of the patent of this application should be subject to the appended claims.

What is claimed is:

1. A network traffic analysis method based on multi-source network traffic data, comprising:
   deploying a classifier pool in each network stream data source of a plurality of network stream data sources; wherein the classifier pool comprises a plurality of trained online classifiers, and each of the network stream data sources deploys one trained online classifier of the plurality of trained online classifiers;
   for each network stream data source:
      collecting current network traffic data by a network traffic collector;
      classifying network traffic data samples by the respective deployed one trained online classifier, wherein each network traffic data sample is classified using the network traffic data for a preset time interval; and
   performing feature processing and transformation on the network traffic data collected by each network stream data source at each preset time interval to obtain processed traffic data features and a feature transformation matrix, and transmitting the processed traffic data features and the feature transformation matrix to a traffic drift detection module; the traffic drift detection module comprising historical concept data to detect a concept drift according to the traffic data features, the feature transformation matrix and the historical concept data; and updating the online classifier deployed in the corresponding network stream data source upon detecting concept drift.

2. The method according to claim 1, wherein the classifier pool comprises a plurality of online classifiers which are updated incrementally, and deploying a classifier pool in a network stream data source comprises:
   deploying the online classifiers in the classifier pool in each network stream data source respectively, and receiving a network stream data sample by the network traffic collector to classify the network stream data sample.

3. The method according to claim 1, wherein performing feature processing and transformation on the network traffic data collected by each network stream data source at each preset time interval to obtain processed traffic data features and a feature transformation matrix comprises:
   centralizing each sample feature in a sample feature matrix to obtain processed sample features $$x_i \leftarrow x_i - \frac{1}{n}\sum_{i=1}^{n}x_i,$$

where $x_i$ represents the $i^{th}$ feature of the sample feature matrix;

updating the data feature matrix by using the processed sample features to obtain an updated data feature matrix S;

calculating a covariance matrix $$\frac{1}{n}S^T S$$

of the updated data feature matrix;

calculating eigenvalues and eigenvectors corresponding to the covariance matrix, and sorting the eigenvalues and the eigenvectors in a descending order of the eigenvalues; selecting the eigenvectors corresponding to the top d eigenvalues to form a feature transformation matrix $U=[w_1, \ldots, w_d]$; and solving Z=SxU according to the data sample and the feature transformation matrix, to obtain a dimension-reduced data feature matrix.

4. The method according to claim 3, wherein detecting a concept drift according to the traffic data features, the feature transformation matrix and the historical concept data comprises:

transforming the data feature matrix of the historical concept data by using the feature transformation matrix to obtain a feature matrix of the historical concept data after feature transformation;

averaging the dimension-reduced data feature matrix and the transformed historical data feature matrix to obtain a data mean;

obtaining a Jensen-Shannon divergence (JS divergence) between the data feature matrix and the historical data feature matrix according to a Kullback-Leibler divergence (KL divergence) of the dimension-reduced data feature matrix and the data mean, a KL divergence of the transformed historical data feature matrix and the data mean; and determining that the network traffic data of the corresponding data source drifts when the JS divergence is greater than a preset significance parameter.

5. The method according to claim 4, wherein the KL divergence of the data feature matrix and the data mean is calculated as follows:

$$KL(z_k\|\mu_k) = \sum_d \mu_k(x)\log\frac{\mu_k(x)}{z_k(x)},$$

wherein $\mu_k$ represents the data mean, $z_k(x)$ represents the dimension-reduced data feature matrix, $KL(z_k\|\mu_k)$ represents the KL divergence of the dimension-reduced data feature matrix and the data mean, and d represents a number of data features.

6. The method according to claim 4, wherein the KL divergence of the historical data feature matrix and the data mean is calculated as follows:

$$KL(p_k\|\mu_k) = \sum_d \mu_k(x)\log\frac{\mu_k(x)}{p_k(x)},$$

wherein $\mu_k$ represents the data mean, $p_k(x)$ represents the historical concept data feature matrix after feature transformation, $KL(p_k\|\mu_k)$ represents the KL divergence of the historical data feature matrix and the data mean, and d represents the number of data features.

7. The method according to claim 4, wherein obtaining a JS divergence between the data feature matrix and the historical data feature matrix according to a KL divergence of the dimension-reduced data feature matrix and the data mean, a KL divergence of the transformed historical data feature matrix and the data mean as follows:

$$JSD(p_k\|z_k) = \frac{1}{2}KL(p_k\|\mu_k) + \frac{1}{2}KL(z_k\|\mu_k),$$

wherein $JSD(p_k\|z_k)$ represents the JS divergence between the data feature matrix and the historical data feature matrix.

8. A network traffic analysis device based on multi-source network traffic data, comprising:

a classifier setting module configured to deploy a classifier pool in each network stream data source of a plurality of network stream data sources, wherein the classifier pool comprises a plurality of trained online classifiers, and each of the network stream data sources deploys one trained online classifier of the plurality of trained online classifiers;

a traffic classification module configured to classify, for each network stream data source, network traffic data samples using the online classifier deployed in the corresponding network stream data source, wherein each network traffic data sample is classified using the network traffic data for a preset time interval, the network traffic data collected by a network traffic collector; and a concept drift detection module configured to perform feature processing and transformation on the network traffic data collected by each network stream data source at each preset time interval, and transmit processed traffic data features and a feature transformation matrix to a traffic drift detection module; wherein the traffic drift detection module comprises historical concept data to detect a concept drift according to the traffic data features, the feature transformation matrix and the historical concept data; and if the concept drift is detected, the online classifier deployed in the corresponding network stream data source is updated.

9. A computer equipment comprising a memory and a processor, wherein the memory stores a computer program, and the processor implements steps of the method according to claim 1 when executing the computer program.

10. A non-transitory computer-readable storage medium on which a computer program is stored, wherein when the computer program is executed by a processor, the steps of the method according to claim 1 are implemented.

* * * * *